United States Patent [19]

Yang

[11] Patent Number: 4,999,482

[45] Date of Patent: Mar. 12, 1991

[54] OPTICAL SCANNING SYSTEM FOR A BAR CODE READER

[75] Inventor: Keun Y. Yang, Seoul, Rep. of Korea

[73] Assignee: Goldstar Co, Ltd., Seoul, Rep. of Korea

[21] Appl. No.: 355,346

[22] Filed: May 23, 1989

[30] Foreign Application Priority Data

May 24, 1988 [KR] Rep. of Korea ............... 6094/1988

[51] Int. Cl.⁵ .............................................. G06K 7/10
[52] U.S. Cl. .................................. 235/457; 235/454; 235/467
[58] Field of Search ............... 235/457, 467; 350/3.71

[56] References Cited

U.S. PATENT DOCUMENTS 4,794,237 12/1988 Ferrante ........................... 235/457

Primary Examiner—Harold Pitts

[57] ABSTRACT

An optical scanning system of a bar code reader utilizing a hologram scanner in which a laser beam from a laser beam generator is divided into three parallel paths by three beam splitters. The beams pass through three focusing lenses and first reflectors. Each of the beams are focused into three holes in second reflectors before being directed in a perpendicular to a hologram disk. The hologram disk deflects the laser beams outwardly before being reflected again by third reflectors. These beams from the third reflectors are used for scanning an article having a bar code with star-shaped pattern beam through a window formed in a housing. The beams are reflected and contain bar code information. The reflected beams are passed back through the window and are reflected by the third reflectors respectively before passing through a hologram disk and being focused and reflected again at the second reflectors. The beams then pass through three pin holes, so that they are detected by photo-detectors.

3 Claims, 3 Drawing Sheets

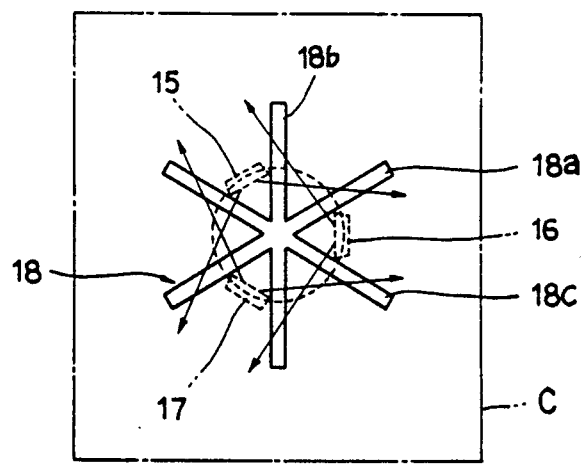
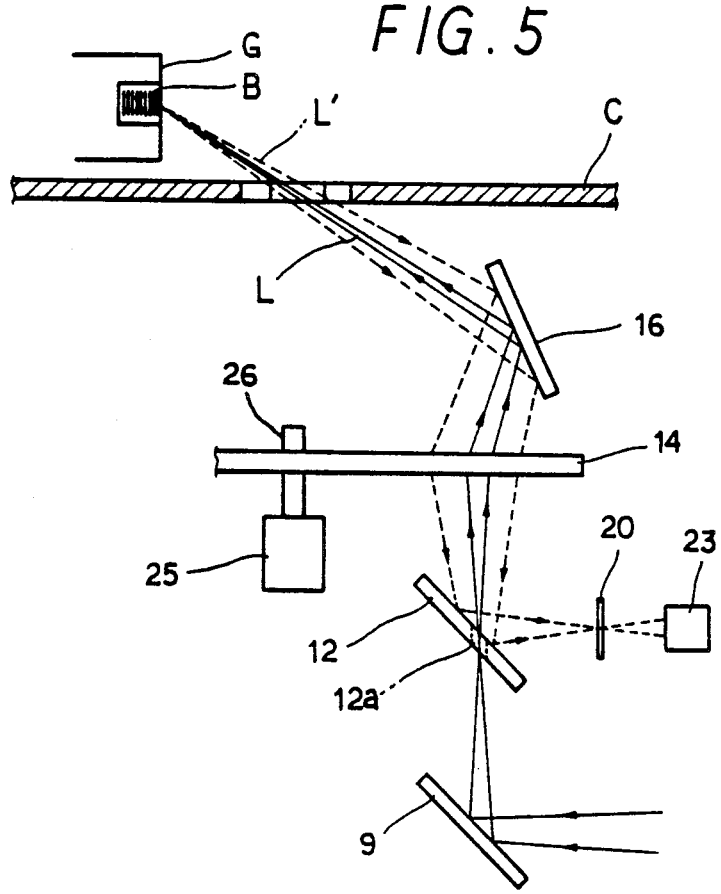

OPTICAL SCANNING SYSTEM FOR A BAR CODE READER

BACKGROUND OF THE INVENTION

The present invention relates to an optical scanning system for a bar code reader which is adapted to discriminate by reading a bar code indicated on an article such as commodities, and in particular, to an optical scanning system for a bar code reader utilizing a hologram scanner.

An apparatus for discriminating a commodity has a bar code reader which is constructed such that when passing an article having a bar code thereon above a window of the apparatus, the bar code reader detects a bar code by utilizing an optical scanning system contained in an apparatus. The bar code reader produces a signal which is converted into a digital signal which can be used to display information on a displaying means. There has been known various forms of such apparatii; however, since a conventional bar code reader is constructed such that a scanning ray beam transmitted through the window of the apparatus permits scanning only one direction, there has been a problem in that the discriminating ability of commodity is defined within a narrow range.

SUMMARY OF THE INVENTION

The object of the present invention is to provide a bar code detecting method and an optical scanning system in which a laser beam generated from a laser beam generator is divided into several directions such that scanning is carried out with a star-shaped pattern. This pattern permits the discriminating range of commodities to increase and discriminating ability to be enhanced.

The present invention is constructed such that a laser beam produced by a laser beam generator is divided by beam splitters and advanced through parallel paths. The split beams pass through focusing lenses and first reflectors respectively such that they are each respectively focused into holes of second reflectors provided at the focusing positions of the focusing lenses. The laser beams pass through each hole of the second reflectors to be incidence upon and deflected from a high speed turning hologram disk. The deflected laser beams scan the exterior of the apparatus through a star-shaped window formed in the housing of apparatus with a star-shaped scanning pattern being formed by third reflectors mounted at the top of the hologram disk. Each laser beam is reflected back from an article having a bar code located at exterior of the housing of the apparatus to be reflected by the third reflectors and focused by the hologram disk. The reflected laser beams pass through pin holes arranged respectively at each focusing position of the hologram disk through the second reflectors so that they are detected by photo-detectors.

Further, there are at least two beam splitters, focusing lenses and first, second, and third reflectors and the first, second and third reflectors are respectively disposed at positions spaced with a predetermined angle to each other around an axis of the hologram disk.

Furthermore, the window formed in the housing of the apparatus is formed with a star-shaped form (i.e., X, ✱ ✱ ....) such that at least two linear holes are crossed with a predetermined angle to each other. This allows each laser beam to be scanned with the star-shaped scanning pattern and pass through the third reflectors.

As described above, according to the present invention, a laser beam produced from a laser beam generator is passed through beam splitters, focusing lenses, and first, second and third reflectors respectively, and it is deflected at a hologram disk. The deflected laser beams scan utilizing the third reflectors with a star-shaped scanning pattern. The laser beams are projected to a wide region at the exterior of the housing of the apparatus through a star-shaped window corresponding to the scanning pattern. Therefore, the scanning region is greatly extended scanning compared to a conventional bar code reader scanning only in one direction, and the discriminating ability with regard to the commodities can be enhanced greatly.

BRIEF DESCRIPTION OF THE DRAWINGS

The foregoing and other objects as well as advantages of the present invention will become more apparent from the following description of the present invention with reference to the accompanying drawings, wherein:

FIG. 4 is a view for showing a window part in FIG. 2; and

FIG. 5 is a schematic diagram showing an operation of the present invention viewed from a direction of one side for illustrating a reading operation of a bar code.

DETAILED DESCRIPTION OF THE PREFERRED EMBODIMENT

Figure 1:
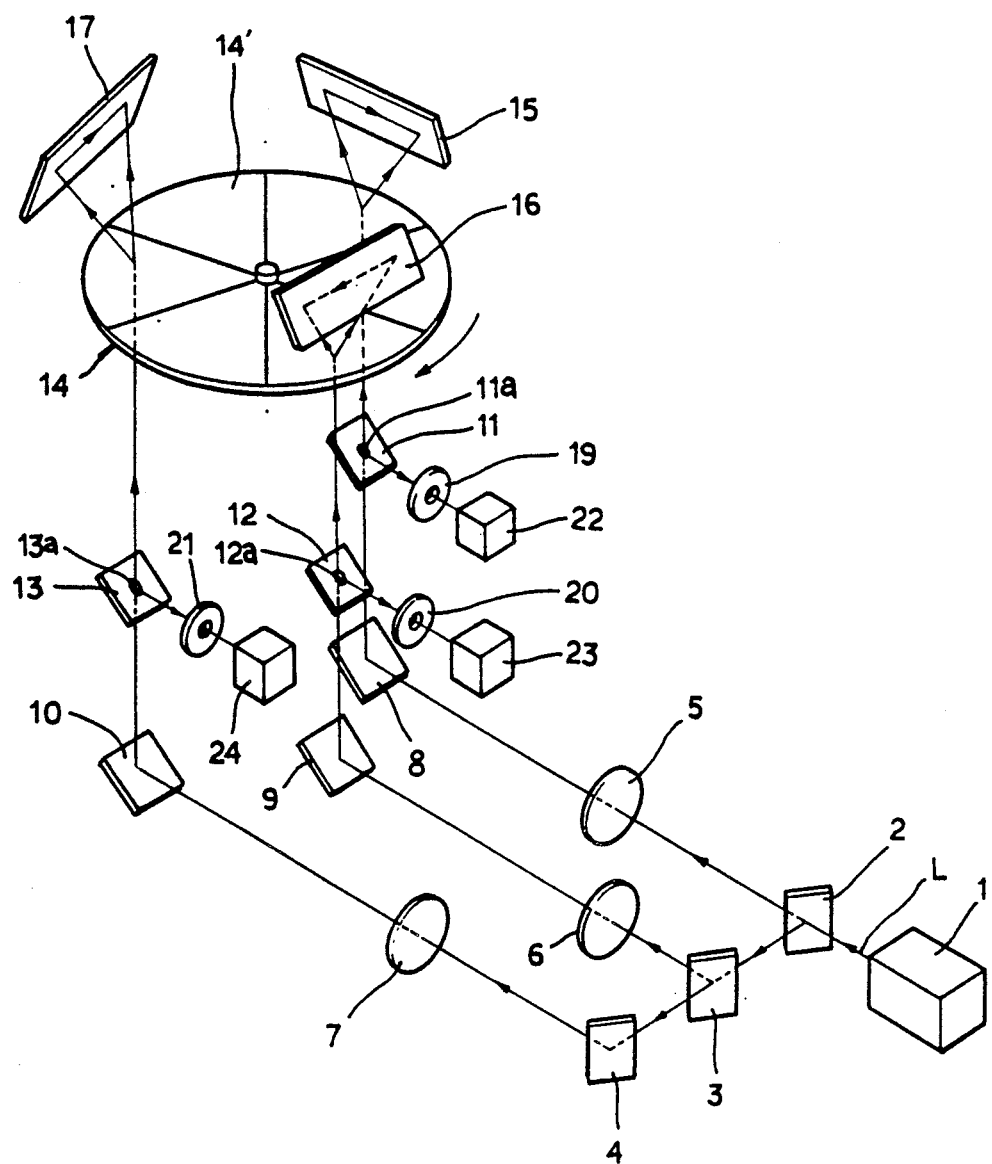
FIG. 1 is a perspective view illustrating a construction of an optical scanning system for a bar code reader of a preferred embodiment according to the present invention.

Below, a preferred embodiment of the present invention will be described in detail with reference to the accompanying drawings, in which throughout the drawings, like reference symbols are used to designate like or equivalent parts or portions for simplicity of illustration and explanation.

Referring to FIGS. 1 to 5, reference numeral 1 is a laser beam generator. A laser beam L is produced from the laser beam generator 1 and divided into three directions by beam splitters 2, 3 and 4 before passing through focusing lenses 5, 6 and 7, respectively. Each path of the laser beams is changed by first reflectors 8, 9 and 10 and is focused into pin holes 11a, 11b and 11c formed in second reflectors 11, 12 and 13, respectively.

At the top of the second reflectors 11, 12 and 13 is mounted a hologram disk 14, from which the beams passed through the pin holes 11a, 12a and 13a, enter and are deflected. Above hologram disk 14, third reflectors 15, 16 and 17 are provided which reflect the laser beams which cause the scanning by the laser beams deflected therefrom in a star-shape ✱ pattern. A star-shaped window 18 passes through the beams reflected from the third reflectors 15, 16 and 17 which is formed in a housing C of the apparatus.

Pin holes 19, 20 and 21 receive the reflected beams L' coming from an article G wherein the reflected beam L' has bar code information therein B after passing through the window 18. Photo-detectors 22, 23 and 24 detect the beams after being passed through the pinholes 19, 20, and 21 and are arranged respectively at one side of the second reflectors 11, 12 and 13.

The hologram disk 14 is rotated by a rotating shaft 26 by a driving means 25.

The driving means 25 can be a motor. In this case, an output shaft of the motor is coupled to the rotating shaft 26 so that the hologram disk 14 is rotated.

However, the hologram driving means 25 can be various forms if the forms have a structure capable of providing constant rotation to the hologram disk at a predetermined speed.

Figure 2:
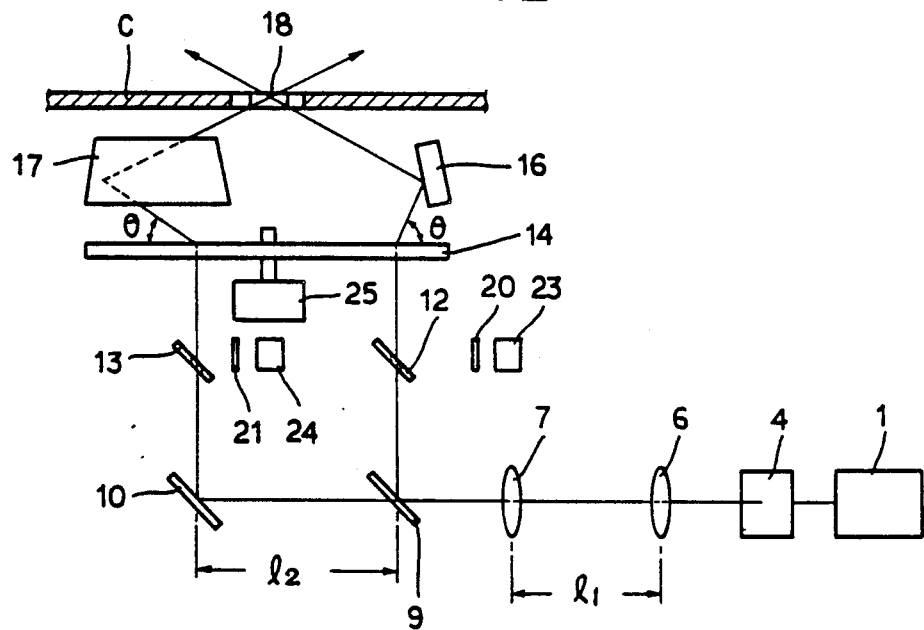
FIG. 2 is a schematic side view of FIG. 1.
Figure 3:
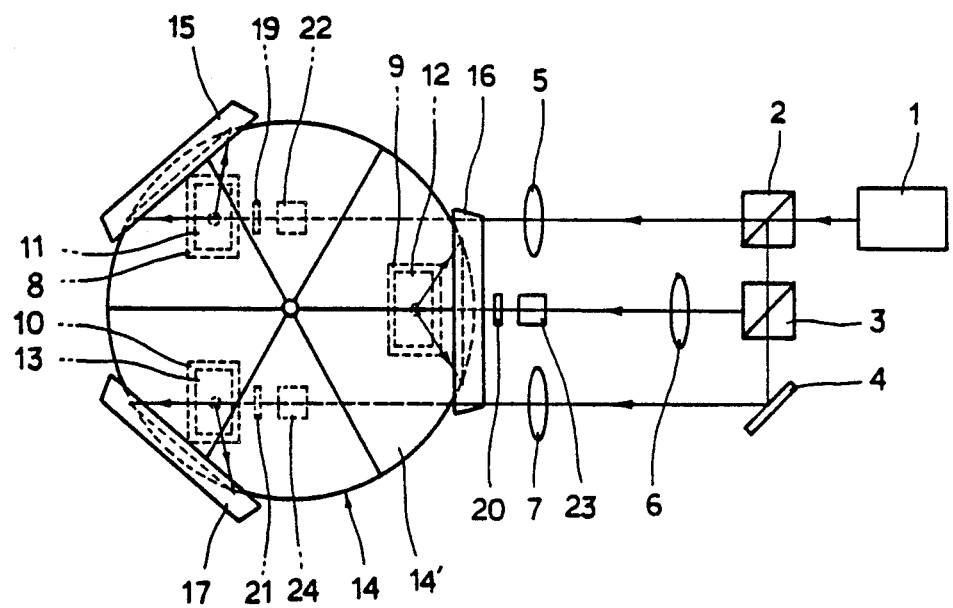
FIG. 3 is a schematic view of FIG. 1.

A hologram 14', forming the hologram disk 14, as shown in FIG. 2, is formed to deflect the beams as much as an angle θ (theta) toward the external direction of the hologram disk 14 when the laser beams are directed perpendicular thereto.

The second reflectors 11, 12 and 13 are provided beneath the hologram disk 14, and the first reflectors 8, 9 and 10 are provided under them. The third reflectors 15, 16 and 17 are provided above the hologram disk 14 and are respectively spaced apart from each other by an angle of 120° around the central axis of the hologram disk 14. A distance $l_1$ between the focusing lenses 5 and 7 and a focusing lens 6 is established to be equal to a distance $l_2$ between the first reflectors 8 and 10 and a reflector 9. The distances between the focusing lenses 5, 6 and 7 and the pin holes 11a, 12a and 13a of the second reflectors 11, 12 and 13 are established to be equal to the focal distance of the focusing lenses 5, 6 and 7 so that the laser beams passing through the focusing lenses 5, 6 and 7 are focused at the pin holes 11a, 12a and 13a of the second reflectors 11, 12 and 13 respectively. The beams are deflected at the hologram disk 14 and then directed to the third reflectors 15, 16 and 17, respectively.

In the window 18, formed in the housing C of the apparatus, linear holes 18a, 18b and 18c are crossed at predetermined angle to form a *-shape (star shape) so that the beams reflected respectively from the third reflectors 15, 16 and 17 are passed respectively through the holes 18a, 18b and 18c of the window 18.

The pin holes 19, 20 and 21 are disposed at the positions that each reflected ray from an article G is focused by the hologram disk 14, so that they are detected by the photo-detectors 22, 23 and 24 so as to minimize interference from other exterior light rays.

Thus, according to the present invention, when the laser beam generator 1 is operated, the laser beam for scanning is divided into three directions by the beam splitters 2, 3 and 4 and are focused respectively to the pin holes 11a, 12a and 13a formed in the second reflectors 11, 12 and 13 by the focusing lenses 5, 6 and 7. At this moment, the first reflectors 8, 9 and 10 change each laser beam's direction such that each laser beam is to be directed to the pin holes 11a, 12a and 13a, respectively.

The beams focused at the pin holes 11a, 12a and 13a of the second reflectors 11, 12 and 13 are respectively directed perpendicular to the hologram disk 14, and as shown in FIG. 2, the laser beams respectively are deflected toward an external direction by a predetermined angle θ (theta) in accordance with the hologram disk 14 being rotated by the driving power of the driving means 25.

The deflected laser beams are respectively reflected by the third reflectors 15, 16 and 17 and then directed to the exterior of the apparatus through the window 18 for scanning a bar code. Since three laser beams are directed simultaneously to the hologram 14', the laser beams directed through the window 18 for scanning become *-form (star form) as shown in FIG. 4.

Thus, when an article G printed with a bar code B is either located near the housing C of the apparatus of the bar code reader and scanned with the laser beams or it is moved across the window 18, as shown in FIG. 5, the laser beams L are deflected onto the surface of the article G. Some parts of the reflected laser beams L' enter through the window 18 and they are respectively reflected again by the third reflectors 15, 16 and 17 and pass through a hologram disk 14 before being focused through the pin holes 19, 20 and 21 and being detected by the photo-detectors 22, 23 and 24 respectively.

As described above, according to the present invention, since the scanning region is increased by dividing the beam into three directions and scanning with *-shaped (star-shaped) pattern Beam L, a bar code is easily detected even if it is indicated at any surface of an article except its top surface, and since it is detected by the laser beams directed on a large region, it can be detected more correctly and with a high speed.

What is claimed is:

1. An optical scanning system for a bar code reader utilizing a hologram scanner, comprising:

a laser beam generator for producing a laser beam;

beam splitters for dividing said laser beam into parallel paths;

focusing lenses and first reflectors for focusing the divided laser beams;

second reflectors provided with first holes, said first holes passing the focused beams therethrough;

a hologram disk rotating at a high speed for deflecting the beams passing through said first holes; and third reflectors disposed respectively at top of said hologram disk for forming the deflected beams into a star-shaped pattern to be passed through a window formed in a housing, said star-shaped beams are reflected from a surface of an article having a bar code;

said reflected laser beams being reflected again by said third reflectors respectively and directed to said hologram disk and focused;

said reflected beams from said hologram disk being reflected again by said second reflectors and passed through second holes disposed at focusing positions of said hologram disk so that said beams from said second pin holes are detected by photo-detectors.

2. The optical scanning system as claimed in claim 1, wherein:

said hologram disk comprises at least three holograms;

said second being reflectors arranged beneath said hologram disk;

said first reflectors being arranged under said second reflectors;

said third reflectors being arranged above said hologram disk and are respectively disposed from each other at an angle of 120° around an axis of said hologram disk; and said window of said housing being formed with a star-shaped pattern such that three linear passing holes are crossed with each other at a predetermined angle.

3. The optical scanning system as claimed in claim 1, wherein:

said hologram disk deflects the laser beams passing through said first holes of said second reflectors toward an external direction from a center axis thereof at a predetermined angle when the laser beams are directed perpendicular to said hologram disk.

* * * * *